United States Patent [19]

Schmitt

[11] Patent Number: 5,673,992
[45] Date of Patent: Oct. 7, 1997

[54] SEALING DEVICE FOR A HEADLAMP ADJUSTOR MECHANISM

[75] Inventor: Karl R. Schmitt, Rockford, Ill.

[73] Assignee: Textron Inc., Providence, R.I.

[21] Appl. No.: 654,910

[22] Filed: May 29, 1996

[51] Int. Cl.$^6$ ................................................. B60Q 1/068
[52] U.S. Cl. ........................... 362/66; 362/267; 362/273; 362/289
[58] Field of Search ............................... 362/61, 66, 80, 362/267, 271, 273, 289, 418, 419, 421, 427, 428

[56] References Cited

U.S. PATENT DOCUMENTS

| | | | |
|---|---|---|---|
| 4,621,307 | 11/1986 | Weber | 362/66 |
| 4,757,428 | 7/1988 | Ryder et al. | 362/66 |
| 4,761,717 | 8/1988 | McMahan et al. | 362/66 |
| 5,003,436 | 3/1991 | Yamada et al. | 362/61 |
| 5,260,857 | 11/1993 | Lukkarinen | 362/66 |
| 5,365,415 | 11/1994 | Schmitt et al. | 362/66 |
| 5,424,923 | 6/1995 | Young et al. | 362/66 |

*Primary Examiner*—Alan Cariaso
*Attorney, Agent, or Firm*—Trexler, Bushnell, Giangiorgi & Blackstone, Ltd.

[57] ABSTRACT

A novel sealing device is used to seal an adjustor mechanism which is used to adjust the position of a movable headlamp component housed within a sealed stationary component in a headlamp arrangement. The stationary component has an opening through a rear wall for insertion of the adjustor mechanism therethrough. The adjustor mechanism includes a housing connected to the stationary component and an adjusting screw member. A shank of the adjusting screw member extends from the housing and extends through the opening in the stationary component wall and into the interior of the stationary component. The novel sealing device of the present invention includes a flexible, elastomeric shroud member having a body portion; a forward sealing structure for sealedly attaching the body portion to the shank of the adjusting screw member; and a rearward sealing structure for sealedly attaching the body portion to the opening in the stationary component. The body portion encircles a portion of the screw shank which is in the interior of the stationary headlamp component. The flexible shroud member substantially prevents the entrance of contaminants into the interior of the stationary component through the adjustor mechanism and through the opening in the stationary component wall.

22 Claims, 2 Drawing Sheets

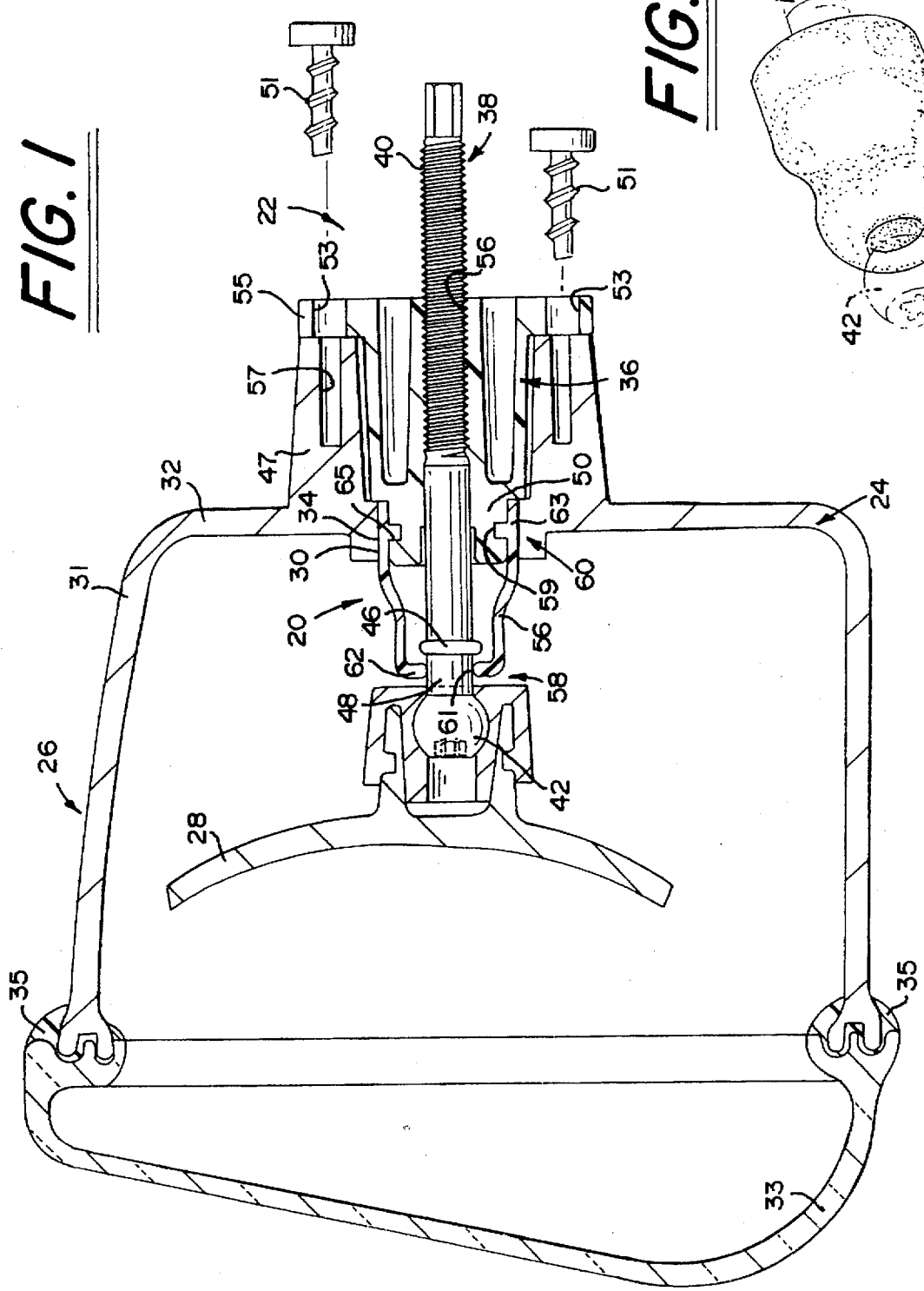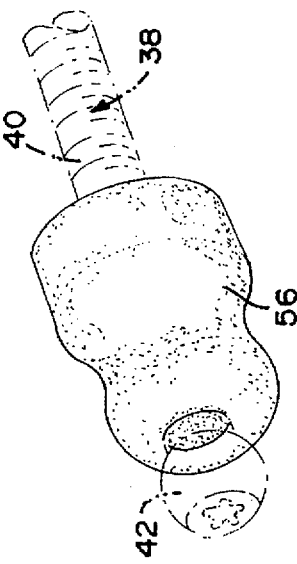

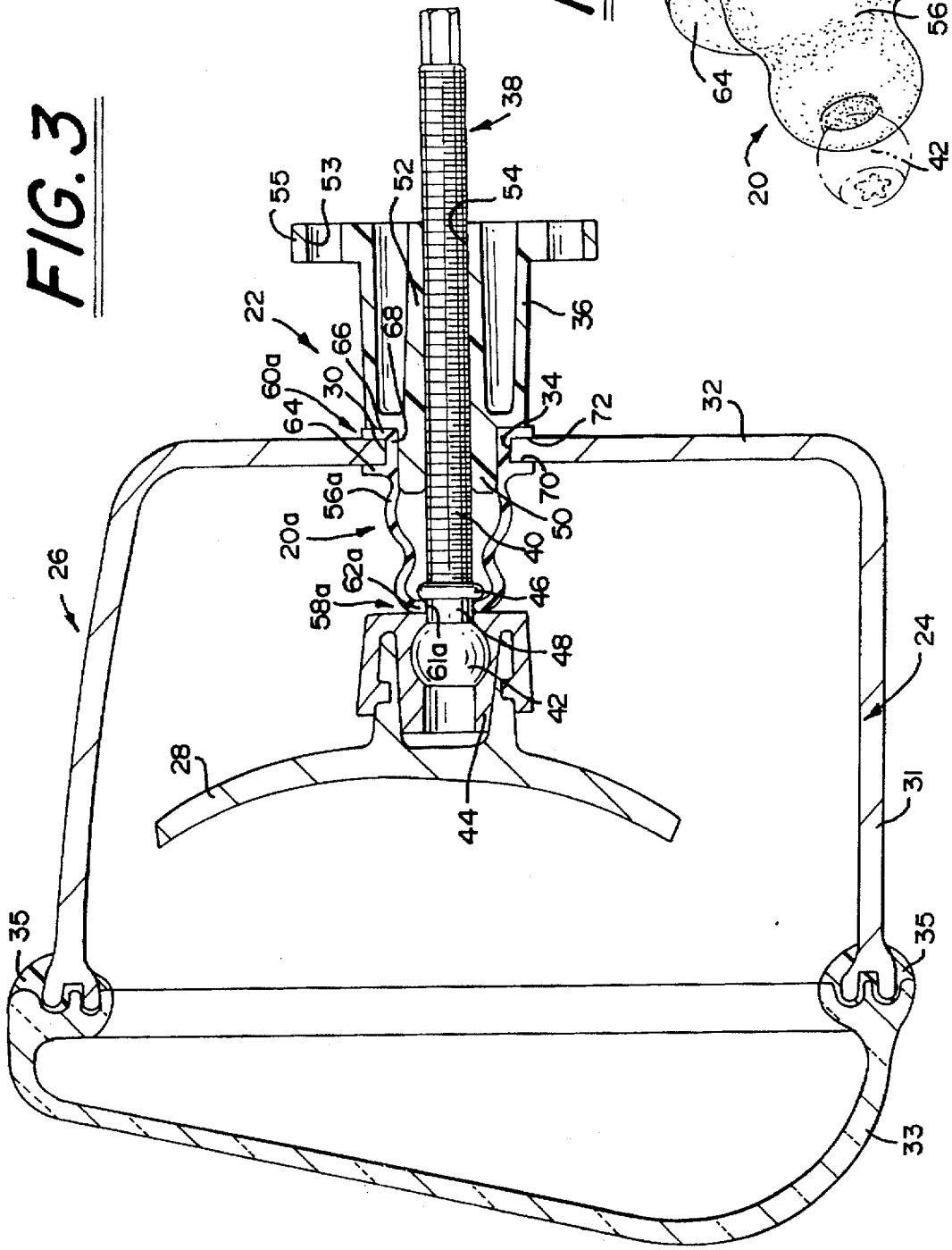

5,673,992

SEALING DEVICE FOR A HEADLAMP ADJUSTOR MECHANISM

BACKGROUND OF THE INVENTION

This invention is generally directed to a novel sealing device for sealing a headlamp adjustor mechanism, which is used to effect movement of a movable reflector component, to a sealed stationary component which forms part of a headlamp arrangement. More particularly, the invention contemplates a novel sealing device which prevents the entrance of contaminants into the interior of the sealed stationary component through the adjustor mechanism and through the junction between the adjustor mechanism and the stationary component.

Commonly, when a movable reflector component is provided to adjust the aiming of a headlamp beam, a headlamp adjustor mechanism is used. The headlamp adjustor mechanism is provided through an opening in the stationary component in which the movable reflector component is housed. The headlamp adjustor mechanism is normally sealed to the stationary component by an O-ring.

The headlamp adjustor mechanism includes a housing having an axial bore therethrough and an adjusting screw member. The adjusting screw member is engaged through the bore and is rotatable relative thereto.

In order to ensure that the headlamp arrangement functions properly, water vapor and other contaminants must be deterred from entering into the interior of the stationary component. If water vapor and/or contaminants gain entrance into the interior of the headlamp arrangement, these contaminants can interfere with the workings of the headlamp arrangement, thereby causing the headlamp arrangement to function improperly or not at all.

Movable reflector headlamps are required by federal law to be sealed to a required pressure decay. This is because of the necessity to keep moisture out of the headlamp arrangement and allow venting from high temperature and pressure developed within the interior of the headlamp arrangement. As is the potential problem with any sealed system, leak paths are created at the weakest interfaces. The leak paths can be a result of manufacturing inconsistencies or design. Presently designed adjustor housings have several leak paths.

Typically, there are two methods of sealing adjustors. First, the adjustor is sealed by a primary seal or gasket, such as an O-ring to the stationary component. Second, a sealant in the form of a patch or the like, is applied to the threads of the adjusting screw member. The sealant prevents air, moisture and dirt from traversing up and down the axis of the adjusting member shank. The application of the sealant to the adjusting screw member, however, increases the cost of the headlamp adjustor mechanism due to the need for the extra component and that labor used to properly apply the sealant.

In the present invention, the primary and secondary sealing means are combined into a boot or total sealing system. This novel device can be utilized on either a through adjustor mechanism or a right-angled adjustor mechanism. The present invention eliminates all other components internal to the gear box which are used for sealing. Other features and advantages which will become apparent upon a reading of the attached specification.

OBJECTS AND SUMMARY OF THE INVENTION

A general object of the present invention is to provide a novel sealing device for sealing an adjustor mechanism to a sealed stationary component which forms part of a headlamp arrangement to prevent the entrance of contaminants, such as air, dirt, water vapor or moisture, into the interior of the headlamp arrangement to prevent the contaminants from interfering with the workings of the headlamp arrangement.

An object of the present invention is to provide a novel sealing device which can be used on a variety of adjustor mechanisms, such as straight-through or right-angle adjustor mechanisms.

Briefly, and in accordance with the foregoing, the present invention discloses a novel sealing device that is used to seal an adjustor mechanism which adjusts the position of a movable reflector component housed within a sealed stationary component in a headlamp arrangement. The stationary component has an opening through a rear wall for insertion of the adjustor mechanism therethrough. The adjustor mechanism includes a housing connected to the stationary component and an adjusting screw member. A shank of the adjusting screw member is disposed in a bore provided through the housing and extends through the opening in the stationary component wall and into the interior of the stationary component. A ball portion on the end of the shank engages the movable reflector component.

The novel sealing device of the present invention is a flexible, elastomeric shroud member having a body portion; a forward sealing structure for sealedly attaching the body portion to the shank of the adjusting screw member; and a rearward sealing structure for sealedly attaching the body portion to the edge of the opening in the stationary component and to the adjustor mechanism housing to seal the junction between the stationary component and the adjustor mechanism housing. The body portion encircles a portion of the screw shank which is in the interior of the stationary component. The flexible member substantially prevents the entrance of water vapor or contaminants, such as dirt, moisture or air, into the interior of the stationary component through the adjustor mechanism and through the junction between the stationary component wall and the adjustor mechanism.

The forward sealing structure, as shown in the drawings, is formed from a bead at a forward end of the body portion. A protruding secure or retaining collar may be provided on the shank of the adjusting screw member at a predetermined distance from the ball portion. The bead is sealedly attached to the shank between the ball portion and the retaining collar. Other forward sealing structures may be used in the present invention.

The rearward sealing structure, as shown in the drawings, is formed from at least one lip which extends from the body portion. In a preferred embodiment, as shown in FIGS. 1 and 2, the rearward sealing structure is formed from one lip which extends inwardly from the body portion and mates with a groove formed around the housing. In a second embodiment, as shown in FIGS. 3 and 4, the rearward sealing structure is formed from two lips which extend outwardly from the body portion and are spaced apart from each other a predetermined distance by a sealing shoulder. Each lip seals against an opposite surface of the wall of the stationary component proximate to the opening and the sealing shoulder seals against the edge of the opening in the rear wall of the stationary component and against the adjustor mechanism housing. In this embodiment the lips are preferably spaced apart from each other a predetermined distance which is slightly less than the width of the stationary component rear wall so that the lips squeeze and seal tightly against the opposite surfaces of the rear wall. Other rearward sealing structures may be used.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a view of a novel sealing device which incorporates the features of a first, preferred embodiment of the present invention for use with a headlamp adjustor mechanism, such headlamp adjustor mechanism being shown partially in cross-section and shown in its environment being engaged with a sealed headlamp arrangement, such headlamp arrangement being shown in cross-section, wherein the headlamp adjustor mechanism is comprised of a housing and an adjusting screw member;

FIG. 2 is a perspective view of the sealing device shown in FIG. 1 and shown surrounding the adjusting screw member which is shown in phantom lines.

FIG. 3 is a view of a novel sealing device which incorporates the features of a second embodiment of the present invention for use with a headlamp adjustor mechanism, such headlamp adjustor mechanism being shown partially in cross-section and shown in its environment being engaged with a sealed headlamp arrangement, such headlamp arrangement being shown in cross-section, wherein the headlamp adjustor mechanism is comprised of a housing and an adjusting screw member; and FIG. 4 is a perspective view of the sealing device shown in FIG. 3 and shown surrounding the adjusting screw member which is shown in phantom lines.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention presents a novel boot seal or sealing device 20, 20a which is used to seal a headlamp adjustor mechanism 22 to a sealed stationary component 24 in a headlamp arrangement 26 to prevent the passage of contaminants, such as air, dirt and/or water vapor, through the adjustor mechanism 22 and through the junction between the adjustor mechanism 22 and the stationary component 24 and into the interior of the headlamp arrangement 26. The headlamp adjustor mechanism 22 is used to adjust the aiming of a movable reflector component 28 which is housed in the sealed stationary component 24 of the headlamp arrangement 26 for an automobile or the like. An adjustor mechanism 22 adjusts the movable reflector component 28 in a horizontal direction, while another similar adjustor mechanism is used to adjust the movable reflector component 28 in a vertical direction.

The headlamp adjustor mechanism 22 is assembled to and inserted through an opening 30 in a rear wall 32 of the housing 31 of the stationary component 24. A lens 33 is sealedly connected to the front of the housing 31 by a seal 35. The opening 30 in the rear wall 32 is defined by an edge 34 and the rear wall 32 has a predetermined thickness.

The novel sealing device 20, 20a of the present invention can be used with a variety of headlamp adjustor mechanisms and is not limited to the headlamp adjustor mechanism 22 shown in the drawings. For example, the sealing device 20, 20a of the present invention can be used with a right-angle adjustor mechanism, such as that disclosed in U.S. Pat. No. 5,365,415, which is commonly owned by the assignee of this application. As shown in FIGS. 1 and 3, the sealing device 20, 20a of the present invention is used with a straight-through headlamp adjustor mechanism 22 generally of the type that includes a bushing or housing 36 and an adjusting screw member 38. The adjusting screw member 38 extends through the housing 36 which is affixed to the stationary component 24 and is engaged with the movable reflector component 28 of the headlamp arrangement 26.

The adjusting screw member 38 is formed from an elongated, threaded shank 40 having a ball portion 42 at one end. The ball portion 42 is disposed in a complementarily shaped socket 44 formed in the movable reflector component 28. The adjusting screw member 38 has an unthreaded end portion which is opposite the ball end. The end portion of the adjusting screw member 38 can be threaded if the application so requires it.

In addition, a secure or retaining collar 46 is provided on the shank 40 proximate to and spaced a predetermined distance from the ball portion 42. The retaining collar 46 protrudes outwardly from the shank 40 and does not enter into the socket 44 provided on the reflector component 28 when the ball portion 42 is seated therein. When the ball portion 42 is inserted into the socket 44, the retaining collar 46 is positioned a predetermined distance away from the outermost extent of the socket 44 so as to define a section 48 of the shank 40 between the outer extent of the socket 44 and the protruding retaining collar 46. The shank section 48 between the ball portion 42 and the retaining collar 46 is unthreaded and smooth for reasons described herein.

The housing 36 is made of a suitable material and is preferably made of plastic by appropriate manufacturing methods such as molding and the like. The housing 36 is generally comprised of a nose portion 50 which is integrally formed with a base portion 52. The nose portion 50 of the plastic housing 36 is inserted through the opening 30 in the stationary component 24 of the headlamp arrangement 26 and has a dimension which is slightly less than the dimension of the opening 30.

As shown in FIGS. 1 and 2, the housing 36 is mounted to the rear wall 32 of the stationary component 24 by screws 51 which extend through bores 53 in a mounting bracket portion 55 of the housing 36 which engage bores 57 formed in a flange 47 integrally formed on the stationary component 24. The adjustor mechanism 22 shown in FIGS. 3 and 4 can be mounted to the stationary component 24 in a like manner, although not shown in the drawings for clarity.

A threaded axial bore 54 is provided through the housing 36 and the adjusting screw member shank 40 is disposed through the bore 54. The adjusting screw member 38 is rotatable relative to the housing 36.

The novel sealing device 20, 20a of the present invention seals the adjustor mechanism 22 and the junction between the adjustor mechanism 22 and the wall 32 of the stationary component 24 to prevent the passage of contaminants, such as air, dirt and/or moisture, through the axial bore 54 through the housing 36 and through the junction between the adjustor mechanism 22 and the rear wall 32 of the stationary component 24 and into the interior of the stationary component 24. A first, preferred embodiment of the sealing device 20 is shown in FIGS. 1 and 2. A second embodiment of the sealing device 20a is shown in FIGS. 3 and 4. First, the specifics of the first embodiment are set forth. Thereafter, the specifics of the second embodiment are set forth. Like elements in each embodiment are denoted by like reference numerals with the like reference numerals in the second embodiment having the suffix "a" after the numeral.

Attention is now directed to FIGS. 1 and 2 which illustrate the features of the first embodiment of the sealing device 20. To employ the first embodiment of the novel sealing device 20, a groove 59 is formed around and in the housing nose portion 50 of the adjustor mechanism 22 at the junction between the nose portion 50 and the stationary component 24.

The sealing device 20 is a flexible, elastomeric shroud member having a main body portion 56; a forward sealing structure 58 at a forward end of the main body portion 56 for sealedly attaching the forward end of the main body portion 56 to the smooth shank section 48 of the adjusting screw member 38; and a rearward sealing structure 60 at a rearward end of the main body portion 56 for sealedly attaching the rear end of the main body portion 56 to the edge 34 of the opening 30 in the stationary component 24 and to the housing nose portion 50. While the forward sealing structure 58 seals against the smooth shank section 48 of the adjusting screw member 38, the adjusting screw member 38 is rotatable relative to the device 20 so that the orientation of the headlamp component 28 can be changed. The main body portion 56 encircles a portion of the screw shank 40 which is in the interior of the stationary component 24.

The main body portion 56 is not taut between the forward and rearward sealing structures 58, 60 so that when the distance between the ball portion 42 of the adjusting screw member 38 and the housing 36 is lengthened to change the orientation of the headlamp component 28, the main body portion 56 will elongate and will not detach from its engagement with the screw shank section 48 as described herein. In addition, when the distance between the ball portion 42 of the adjusting screw member 38 and the housing 36 is shortened to change the orientation of the headlamp component 28, the main body portion 56 will buckle and will not detach from its engagement with the screw shank section 48.

The forward sealing structure 58 is formed from an opening 61 having a bead 62 therearound which is integrally formed at a forward end of the main body portion 56. The diameter of the opening 61 is slightly smaller than the diameter of the shank section 48 to provide for a tight seal against the section 48. The bead 62 seals against the screw shank section 48 between the ball portion 42 and the retaining collar 46. Other forward sealing structures may be used in the present invention.

The rearward sealing structure 60 is positioned at the opening 30 between the adjustor mechanism housing 36 and the rear wall 32 of the stationary component 24. The rearward sealing structure 60 is formed from an inwardly extending lip 65 which extends completely around the main body portion 56 at a rear portion 63 thereof. The lip 65 is integrally formed with the main body portion 56 and has a size which is approximately equal to the size of the groove 59.

When the rearward sealing structure 60 is engaged between the adjustor mechanism 22 and the rear wall 32 of the stationary component 24, the lip 65 tightly seats within the groove 59 and the rear portion 63 seals against the edge 34 of the opening 30 and the portion of the nose portion 50 of the adjustor mechanism housing 36 which extends through and is proximate to the opening 30. Other rearward sealing structures may be used.

Alternatively, the lip 65 may be provided so as to extend outwardly from the rear portion 63 of the main body portion 56. If this structure is provided, a mating groove, like groove 59, is provided in the edge 34 of the opening 30 to accept the lip 65.

Because of the rearward sealing structure 60, water vapor and other contaminants cannot pass through the junction between the adjustor mechanism 22 and the rear wall 32 of the stationary component 24. In addition, because of the sealing structures 58 and 60, water vapor and other contaminants cannot pass through the junction between the forward end of the sealing device 20 and the screw shank 40. In addition, because of the forward sealing structure 58, any water or vapor or contaminants, such as air and/or moisture, which passes through the axial bore 54 in the headlamp adjustor mechanism housing 36 will collect within the sealing device 20 and will not pass into the interior of the stationary component 24.

When the adjustor mechanism 22 is operated to move the movable reflector component 28, and the length between the ball portion 42 and the housing 36 is lengthened, the flexible, elastomeric main body portion 56 of the sealing device 20 will elongate and will not detach from its engagement at its forward or rearward sealing structures 58, 60 while allowing the adjusting screw member 38 to rotate relative to the forward sealing structure 58. Similarly, when the length between the ball portion 42 and the housing 36 is shortened, the flexible, elastomeric main body portion 56 of the sealing device 20 will buckle and will not detach from its engagement at its forward or rearward sealing structures 58, 60 while allowing the adjusting screw member 38 to rotate relative to the forward sealing structure 58.

Attention is now directed to the second embodiment of the invention shown in FIGS. 3 and 4. The second embodiment of the sealing device 20a is identical in structure to that shown in the first embodiment with the exception of the rearward sealing structure. Thus, all elements and features of the first embodiment of the device 20 are equally applicable to the second embodiment of the device 20a and therefore, are not repeated herein. The identical elements of the second embodiment to that of the first embodiment are labeled in FIGS. 3 and 4 with like reference numerals with the addition of the suffix "a" attached thereto. Finally, the groove 59 provided in the nose portion 50 of the adjustor mechanism 22 is eliminated in this embodiment.

The rearward sealing structure 60a is positioned at the opening 30 between the adjustor mechanism housing 36 and the rear wall 32 of the stationary component 24. The rearward sealing structure 60a is formed from two outwardly extending lips 64, 66 which extend completely around the main body portion 56a, and are spaced apart from each other a predetermined distance by a sealing shoulder 68. The lips 64, 66 and the sealing shoulder 68 are integrally formed with the main body portion 56a. Preferably, the width of the sealing section 68 is less than the width of the rear wall 32 of the stationary component 24.

When the rearward sealing structure 60a is engaged between the adjustor mechanism 22 and the rear wall 32 of the stationary component 24, the lips 64, 66 squeeze the rear wall 32 and each lip 64, 66 seals against opposite surfaces 70, 72 of the rear wall 32 of the stationary component 24 proximate to the opening 30 and the sealing shoulder 68 seals against the edge 34 of the opening 30. In addition, the sealing shoulder 68 seals against the portion of the nose portion 50 of the adjustor mechanism housing 36 which extends through and is proximate to the opening 30. The lips 64, 66 are spaced apart from each other a predetermined distance which is slightly less than the width of the stationary component rear wall 32 so that the lips 64, 66 seal tightly against the opposite surfaces 70, 72 of the rear wall 32. Other rearward sealing structures may be used.

Because of the rearward sealing structure 60a, water vapor and other contaminants cannot pass through the junction between the adjustor mechanism 22 and the rear wall 32 of the stationary component 24. In addition, because of the sealing structures 58a and 60a, water vapor and other contaminants cannot pass through the junction between the forward end of the sealing device 20a and the screw shank 40. In addition, because of the forward sealing structure 58a, any water or vapor or contaminants, such as air and/or moisture, which passes through the axial bore 54 in the headlamp adjustor mechanism housing 36 will collect within the sealing device 20a and will not pass into the interior of the stationary component 24.

It is to be understood that several modifications to the above-described embodiments of the device 20, 20a are within the scope of the present invention. For example, the adjusting screw member 38 may include a groove in which the forward sealing bead 62, 62a is disposed to eliminate the use of the retaining collar 46. The rearward sealing structure 60, 60a may take several forms other than those described herein to match with the variety of gear boxes provided in adjustor mechanisms and their respective mounting systems. Therefore, the sealing structures 58, 60; 58a, 60a shown and described herein are specific to, but not limited to, the embodiment of the adjustor mechanism 22 disclosed herein.

A suitable venting structure (not shown) may be provided on the adjustor mechanism 22 in order to in order to controllably vent the air and/or contaminants from within the sealing device 20, 20a to the atmosphere. Such a venting structure may be provided in accordance with co-pending patent application entitled Headlamp Adjustor With Vent Tube, Ser. No. 08/509,130 filed on Jul. 31, 1995, commonly owned by the assignee herein. In addition, the stationary component 24 may include a venting structure (not shown) thereon in order to controllably vent water vapor, air and/or contaminants from within the headlamp arrangement 26 to the atmosphere without allowing the entrance of air and/or contaminants back into the headlamp arrangement 26. The venting structure is preferably provided by a filter or a moisture trap.

While preferred embodiments of the present invention are shown and described, it is envisioned that those skilled in the art may devise various modifications of the present invention without departing from the spirit and scope of the appended claims.

The invention claimed is:

1. A sealing device for sealing an adjustor mechanism to a stationary component of headlamp arrangement, said adjustor mechanism for use in adjusting the position of a movable headlamp component housed in an interior of said stationary component in said headlamp arrangement, said stationary component including a wall having an opening for insertion of said adjustor mechanism therethrough, said adjustor mechanism comprising a housing connected to said stationary component at a junction and an adjusting screw member having an elongated shank extending from said housing and extending through said opening in said wall of said stationary component and into said interior of said stationary component, said sealing device comprising: a flexible seal member having a body portion; a forward sealing structure for sealedly attaching said body portion to said shank of said adjusting screw member; and a rearward sealing structure for sealedly engaging said body portion proximate said opening to seal the junction between said housing and said opening, said body portion encircling a portion of said adjusting screw member shank which is in said interior of said stationary headlamp component, said flexible seal member substantially preventing the entrance of contaminants into the interior of said stationary headlamp component through said adjustor mechanism.

2. A sealing device as defined in claim 1, wherein said flexible seal member is elastomeric.

3. A sealing device as defined in claim 1, wherein said forward sealing structure comprises a bead at a forward end of said body portion.

4. A sealing device as defined in claim 1, wherein said rearward sealing structure comprises at least one lip which extends from said body portion, said lip being engaged with one of said wall of said stationary component or with said adjustor mechanism housing.

5. A sealing device as defined in claim 4, wherein said rearward sealing structure comprises at least one lip which extends from said body portion, said lip being engaged within a mating groove formed on said adjustor mechanism housing.

6. A sealing device as defined in claim 4, wherein said rearward sealing structure comprises two lips which extend from said body portion and are spaced apart from each other a predetermined distance, each said lip being engaged against opposite surfaces of said wall of said stationary component.

7. A sealing device as defined in claim 6, wherein said wall has a predetermined width and said predetermined distance which said lips are spaced apart from each other is less than the width of said wall.

8. A sealing device as defined in claim 1, wherein said forward sealing structure comprises a bead at a forward end of said body portion and said rearward sealing structure comprises at least one lip which extends from a rearward portion of said body portion, said lip being engaged with one of said wall of said stationary component or said adjustor mechanism housing.

9. A sealing device as defined in claim 8, wherein said rearward sealing structure comprises at least one lip which extends from said body portion, said lip being engaged within a mating groove formed on said adjustor mechanism housing.

10. A sealing device as defined in claim 8, wherein said rearward sealing structure comprises two lips which extends outwardly from said body portion and are spaced apart from each other a predetermined distance, each said lip being engaged against opposite surfaces of said wall of said stationary component.

11. A sealing device as defined in claim 1, wherein said adjusting screw member shank includes a ball portion at one end thereof and a retaining collar which protrudes outwardly from said shank, said retaining collar being disposed a predetermined distance from said ball portion to define a section, said forward sealing structure being sealedly attached to said shank at said section.

12. A sealing device as defined in claim 11, wherein said forward sealing structure comprises a bead at a forward end of said body portion.

13. A sealed adjustor mechanism for use in adjusting the position of a movable headlamp component in a headlamp arrangement, said movable headlamp component being housed in an interior of a sealed stationary component, said stationary component including a wall having an opening therethrough, said sealed adjustor mechanism comprising:

a housing connected to said stationary component at a junction;

an adjusting screw member, said adjusting screw member including an elongated shank extending from said housing and extending into said interior of said stationary component; and a flexible seal member having a body portion, a forward sealing structure for sealedly attaching said body portion to said shank of said adjusting screw member, and a rearward sealing structure for sealedly engaging said body portion proximate said opening to seal the junction between said housing and said opening, said body portion encircling a portion of said adjusting screw member shank which is in said interior of said stationary headlamp component, said flexible seal member substantially preventing the entrance of contaminants into the interior of said stationary headlamp component through said adjustor mechanism.

14. A sealed adjustor mechanism as defined in claim 13, wherein said forward sealing structure comprises a bead at a forward end of said body portion.

15. A sealed adjustor mechanism as defined in claim 13, wherein said rearward sealing structure comprises at least one lip which extends from said body portion, said lip being engaged against one of said wall of said stationary component or said adjustor mechanism housing.

16. A sealed adjustor mechanism as defined in claim 13, wherein said rearward sealing structure comprises at least one lip which extends from said body portion, said lip being engaged within a groove formed on said adjustor mechanism housing.

17. A sealed adjustor mechanism as defined in claim 13, wherein said rearward sealing structure comprises two lips which extends outwardly from said body portion and are spaced apart from each other a predetermined distance, each said lip being engaged against opposite surfaces of said wall of said stationary component.

18. A sealed adjustor mechanism as defined in claim 13, wherein said forward sealing structure comprises a bead at a forward end of said body portion and said rearward sealing structure comprises at least one lip which extends from said body portion, said lip being engaged against one of said wall of said stationary component or said adjustor mechanism housing.

19. A sealed adjustor mechanism as defined in claim 13, further including a ball portion disposed at an end of said adjusting screw member shank, and wherein said shank of said adjusting screw member includes a retaining collar which protrudes outwardly from said shank, said retaining collar being disposed a predetermined distance from said ball portion to define a section, said forward sealing structure being sealedly attached to said shank at said section.

20. A sealed adjustor mechanism as defined in claim 19, wherein said forward sealing structure comprises a bead at a forward end of said body portion.

21. A sealing device for sealing an adjustor mechanism to a stationary component of headlamp arrangement, said adjustor mechanism for use in adjusting the position of a movable headlamp component housed in an interior of said stationary component in said headlamp arrangement, said stationary component including a wall having an opening for insertion of said adjustor mechanism therethrough, said adjustor mechanism comprising a housing connected to said stationary component at a junction and an adjusting screw member having an elongated shank extending from said housing and extending through said opening in said wall of said stationary component and into said interior of said stationary component, said sealing device comprising: a flexible seal member having a body portion; a forward sealing structure for sealedly attaching said body portion to said shank of said adjusting screw member; and a rearward sealing structure for sealedly engaging said body portion against said adjustor mechanism housing, said body portion encircling a portion of said adjusting screw member shank which is in said interior of said stationary headlamp component, said flexible seal member substantially preventing the entrance of contaminants into the interior of said stationary headlamp component through said adjustor mechanism.

22. A sealing device as defined in claim 21, wherein said rearward sealing structure sealedly attaches said body portion to the junction between said stationary component and said adjustor mechanism housing for substantially preventing the entrance of contaminants into the interior of said stationary headlamp component through said opening in said stationary component wall.

\* \* \* \* \*